(12) United States Patent
Qiu

(10) Patent No.: US 11,103,010 B2
(45) Date of Patent: Aug. 31, 2021

(54) BATTERY ASSEMBLY AND ELECTRONIC CIGARETTE WITH SAME

(71) Applicant: Changzhou Patent Electronic Technology Co., LTD, Jiangsu (CN)

(72) Inventor: Weihua Qiu, Jiangsu (CN)

(73) Assignee: CHANGZHOU PATENT ELECTRONIC TECHNOLOGY CO., LTD, Jiangsu (CN)

( * ) Notice: Subject to any disclaimer, the term of this patent is extended or adjusted under 35 U.S.C. 154(b) by 273 days.

(21) Appl. No.: 16/469,051

(22) PCT Filed: Dec. 15, 2017

(86) PCT No.: PCT/CN2017/116649
§ 371 (c)(1),
(2) Date: Jun. 12, 2019

(87) PCT Pub. No.: WO2018/108171
PCT Pub. Date: Jun. 21, 2018

(65) Prior Publication Data
US 2020/0099020 A1    Mar. 26, 2020

(30) Foreign Application Priority Data
Dec. 16, 2016 (CN) .......................... 201621390005.0

(51) Int. Cl.
*A24F 13/00* (2006.01)
*A24F 40/49* (2020.01)
(Continued)

(52) U.S. Cl.
CPC .............. *A24F 40/49* (2020.01); *A24F 40/40* (2020.01); *A24F 40/50* (2020.01);
(Continued)

(58) Field of Classification Search
CPC ....................................................... A24F 47/00
(Continued)

(56) References Cited

U.S. PATENT DOCUMENTS 5,012,055 A * 4/1991 Matsui .................... H01H 13/50
200/408
6,943,311 B2 * 9/2005 Miyako .............. H01H 13/7065
200/339

(Continued)

FOREIGN PATENT DOCUMENTS

CN 204088411 U 1/2015
CN 205456059 U 8/2016
(Continued)

*Primary Examiner* — Phuong K Dinh
(74) *Attorney, Agent, or Firm* — Novick, Kim & Lee, PLLC; Allen Xue

(57) ABSTRACT

A battery pack includes a battery main body and a cover assembly arranged on the battery main body. The battery main body has a mounting groove. A side wall of the mounting groove is provided with a clamping portion. The battery main body is electrically connected to a switch. The cover assembly includes a cover movably arranged in the mounting groove, a locking structure arranged on the cover, and an abutting member arranged, corresponding to the switch, between the mounting groove and the cover. The locking structure includes a locking member movably arranged, corresponding to the clamping portion, on the cover, and a second elastic member elastically abutting between the cover and the locking member. The locking member and the clamping portion can be disengaged by prodding the locking member, and thus the cover can be pressed so that the abutting member abuts against and closes the switch.

15 Claims, 7 Drawing Sheets

(51) Int. Cl.
  *A24F 40/40*    (2020.01)
  *A24F 40/50*    (2020.01)
  *H01M 50/148*   (2021.01)
  *H01M 50/147*   (2021.01)
  *A24F 40/10*    (2020.01)

(52) U.S. Cl.
  CPC ....... *H01M 50/147* (2021.01); *H01M 50/148* (2021.01); *A24F 40/10* (2020.01); *H01M 2220/30* (2013.01)

(58) Field of Classification Search
  USPC .................. 131/328–329; 200/5 E, 5 R, 341
  See application file for complete search history.

(56) References Cited

U.S. PATENT DOCUMENTS

| | | | |
|---|---|---|---|
| 7,982,151 B2 * | 7/2011 | Villain ................... | H01H 13/64 200/406 |
| 8,003,901 B2 * | 8/2011 | Sugimoto .............. | H01H 21/24 200/5 E |
| 2011/0226236 A1 * | 9/2011 | Buchberger ............ | A24F 40/46 128/200.23 |
| 2015/0181930 A1 * | 7/2015 | Liu ......................... | A24F 40/50 131/329 |

FOREIGN PATENT DOCUMENTS

| | | |
|---|---|---|
| CN | 205595379 U | 9/2016 |
| CN | 205624465 U | 10/2016 |
| CN | 206250251 U | 6/2017 |
| WO | 2015/039275 A1 | 3/2015 |

* cited by examiner

BATTERY ASSEMBLY AND ELECTRONIC CIGARETTE WITH SAME

CROSS REFERENCE TO RELATED APPLICATION

The application is a national stage application of International Patent Application No. PCT/CN2017/116649, entitled "BATTERY ASSEMBLY AND ELECTRONIC CIGARETTE WITH SAME," filed on Dec. 15, 2017, which claims the benefit of priority of Chinese Patent Application No. 201621390005.0, filed on Dec. 16, 2016. All of the aforementioned patent applications are hereby incorporated by reference in their entireties.

FIELD OF TECHNOLOGY

The utility model relates a technical field of smoking simulation, and more particular, relates to a battery pack and an electronic cigarette having the battery pack.

BACKGROUND

A battery pack of an electronic cigarette is configured to provide power for an atomizing head to enable the atomizing head to atomize the tobacco liquid. When in use, a cover is directly pressed to enable a contractor on the cover to contact a contactor connected to the battery, a circuit is thereby powered on, thus the battery pack outputs power. When the electronic cigarette is accessible for children, an unintended activation may occur, the switch of the battery may be pressed for a long time or be pressed continually, leading to a dry braised to the atomizing core in the atomizing head, the atomizing core is thereby damaged, or the battery itself is hurt, a service life of the electronic cigarette is seriously affected. More likely, a smoking utilizing the electric cigarette by children may occur, there is a potential safety hazard.

SUMMARY

Accordingly, it is necessary to provide a battery pack and an electronic cigarette having the battery pack, a contact or swallowing of tobacco liquid by children can be effectively avoided.

The technical solution adopted by the present disclosure to solve the problem is that:

A battery pack includes a battery main body and a cover assembly. The battery main body is electrically connected to a switch and defines a mounting groove, and a sidewall of the mounting groove having a clamping portion. The cover assembly is positioned on the battery main body, and includes a cover movably positioned in the mounting groove; a locking structure positioned on the cover; and an ejecting member corresponding to the switch, and positioned between the mounting groove and the cover. The locking structure includes a locking member movably positioned on the cover and corresponding to the latching portion, and a second elastic member elastically resisted between the cover and the locking member, when the locking member is toggled to separate from the clamping portion, the cover is capable of being pressed to enable the ejecting member to resist and close the switch, when the cover is released, the cover is capable of returning to an original position, and the locking is exerted by the second elastic member to return to the original position and latches with the clamping portion.

Further, an end of the ejecting member away from the battery main body is fixedly connected to the cover, the cover assembly further includes a first elastic member elastically positioned between the battery main body and the cover, when the cover is pressed, the first elastic member compressed by the cover is enabled to drive the ejecting member to move, causing the ejecting member to resist and close the switch, when the cover is released, the cover is exerted by the first elastic member, driving the ejecting member to move and returning to the original position, thereby allowing the ejecting member to separate from the switch.

Further, an end of the ejecting member elastically resists the switch, an opposite end of the ejecting member elastically resists the cover, when the cover is pressed, the ejection is deformed and closes the switch, when the cover is released, the ejection returns to the original position and causes the switch to flick out.

Further, the cover defines a positioning groove corresponding to the clamping portion, the locking member is movably positioned in the positioning groove, an end of the second elastic member elastically resists a sidewall of the clamping portion away from the positioning groove, an opposite end of the second elastic member elastically resists the locking member Further, the locking structure further includes a restricting member fixedly connected to a sidewall of the positioning groove adjacent to the battery main body, the locking member is provided with a restricting portion, the restricting member is capable of resisting a side of the restricting portion adjacent to the clamping portion Further, the locking member is provided with a locking portion corresponding to the clamping portion, the locking portion engages the clamping portion, when exerted by the second elastic member, the locking portion is a capable of latching with the clamping portion.

Further, the cover assembly further includes a lining member mounted within the mounting groove and a connecting member positioned between the lining member and the cover, the lining member is positioned on a side of the cover adjacent to the battery main body, the lining member is fixedly connected to the cover via the connecting member.

Further, the lining member defines a restricting hole, the cover defines a connecting hole corresponding to the restricting hole, an end of the connecting member forms an abutting portion extending outwardly from a periphery of the connecting member, the abutting portion is capable of resisting the restricting hole after the connecting member extends through the restricting hole, an opposite end of the connecting member is fixedly connected to the cover.

Further, the lining member defines a through hole corresponding to the switch, the ejecting member extends through the through hole and is capable of resisting and closing the switch.

An electronic cigarette, include aforementioned battery pack.

The advantages of the present disclosure are described as follows:

In the battery pack or electronic cigarette provided by the present disclosure, by a configuration of the locking structure, prior to pressing the cover, the locking member is toggled first for reliving a locking state of the cover, after the battery pack being used, the cover is released, the cover can return to the original position automatically and is locked by the locking structure, a contact or swallowing by children can be avoided, it has a predetermined children protective function

BRIEF DESCRIPTION OF THE DRAWINGS

The invention is specifically illustrated with reference to accompanying drawings and embodiments in the following description.

Figure 1:
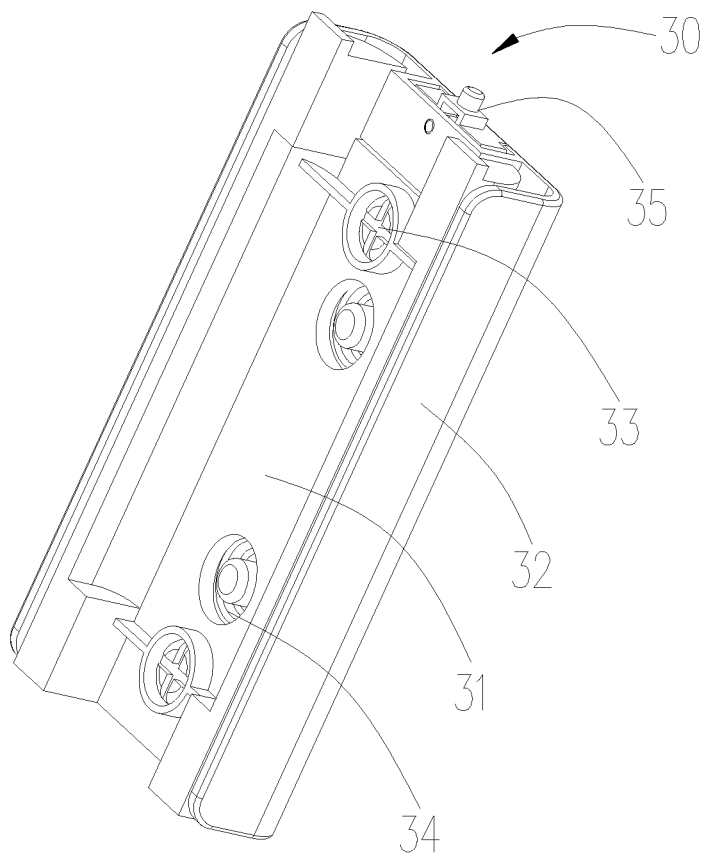
FIG. 1 is a structural view of a cover assembly of a first embodiment of the present disclosure.

DESIGNATIONS AND REFERENCE NUMERALS OF THE PART AND COMPONENT IN THE ACCOMPANYING DRAWINGS

| | | |
|---|---|---|
| Battery pack 100, 200 | Battery main body 10 | Control panel 20 |
| Cover assembly 30 | Lining member 31 | Cover 32 |
| Connecting member 33 | First elastic member 34 | Locking structure 35 |
| Mounting groove 101 | Latching portion 102 | Switch 201 |
| Restricting hole 311 | Through hole 312 | Connecting hole 321 |
| Ejecting member 322 | Positioning groove 323 | Locking member 351 |
| Second elastic member 352 | Restricting member 353 | Locking portion 3511 |
| Positioning post 3512 | Restricting portion 3513 | Toggling portion 3514 |
| Fastener 313 | Protrusion 314 | Cutout 324 |
| Groove 3515 | Abutting portion 331 | First flat surface 3221 |
| Second flat surface 3222 | | |

DETAILED DESCRIPTION OF EMBODIMENTS

The invention is specifically illustrated with reference to accompanying drawings. The accompanying drawings are schematic views which simplified shows fundamental structures of an exemplary embodiment of the invention. Thus, merely the constructions related to the invention are shown.

Figure 6:
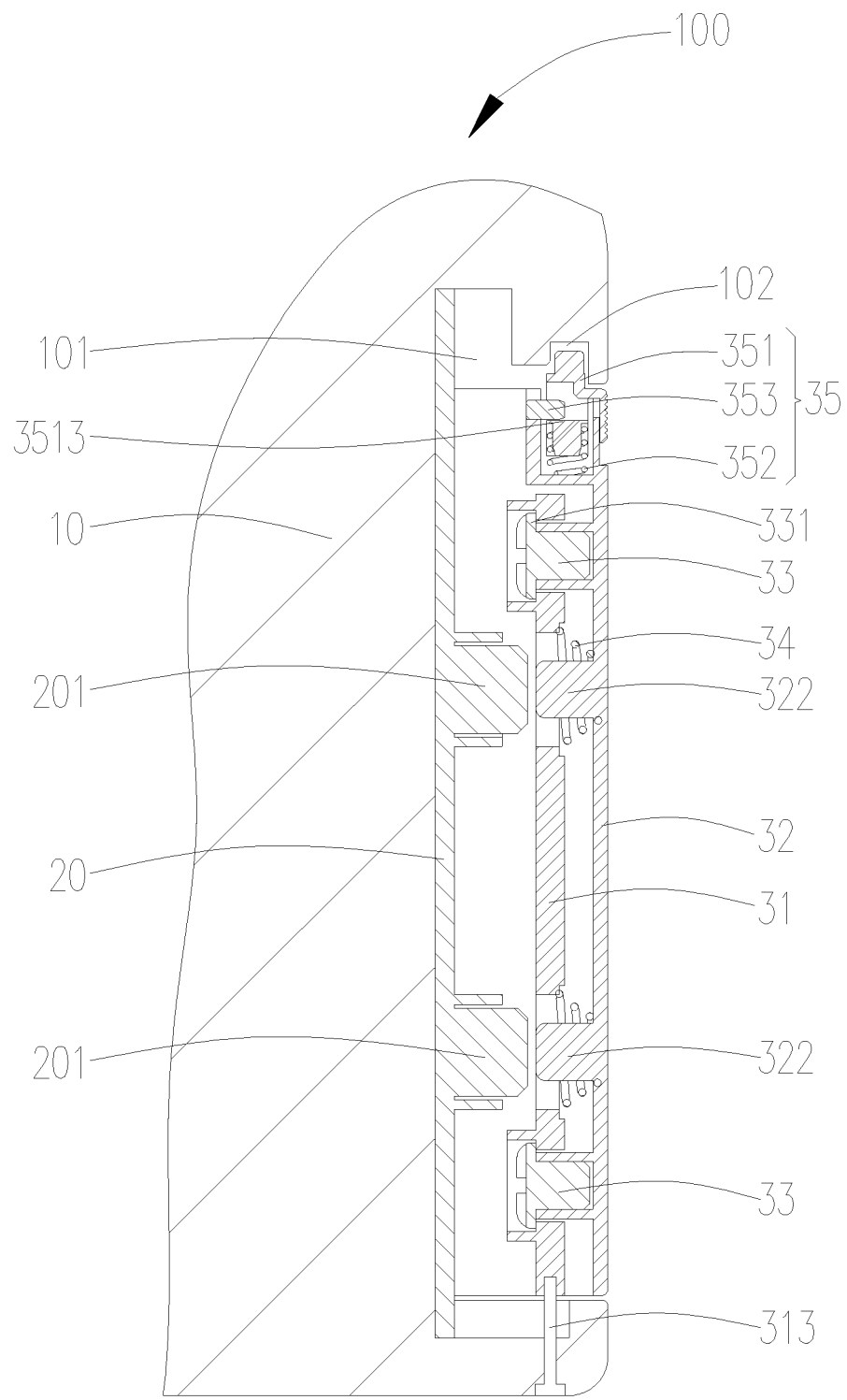
FIG. 6 is a structural view of the cover assembly of FIG. 1 of the present disclosure, incorporated with a battery pack (the cover is locked)

Referring to FIG. 1 and FIG. 6, a battery pack 100 configured for an electronic cigarette is provided by the present disclosure. The battery pack 100 includes a battery main body 10, a control panel 20 and a cover assembly 30 mounted on the battery main body 10. In the illustrated embodiment, it is specified in the present disclosure that, a direction away from an axial of the battery main body 10 is defined an outward direction.

The battery main body 10 defines a mounting groove 101, a sidewall of the mounting groove 101 is provided with a clamping portion 102. In the illustrated embodiment, the clamping portion 102 is a latching groove recessed from the sidewall of the mounting groove 101.

The control panel 20 is fixedly mounted of the bottom wall of the mounting groove 101. The control panel 20 is provided with a pair of switches 201 electrically connected to the battery main body 10. In the illustrated embodiment, the switch 201 is an elastic switch. When the switch 201 is compressed to be closed, the battery main body 10 directs power for external appliance.

The cover assembly 30 includes a lining member 31, a cover 32, a connecting member 33, a first elastic member 34, and a locking structure 35.

Figure 2:
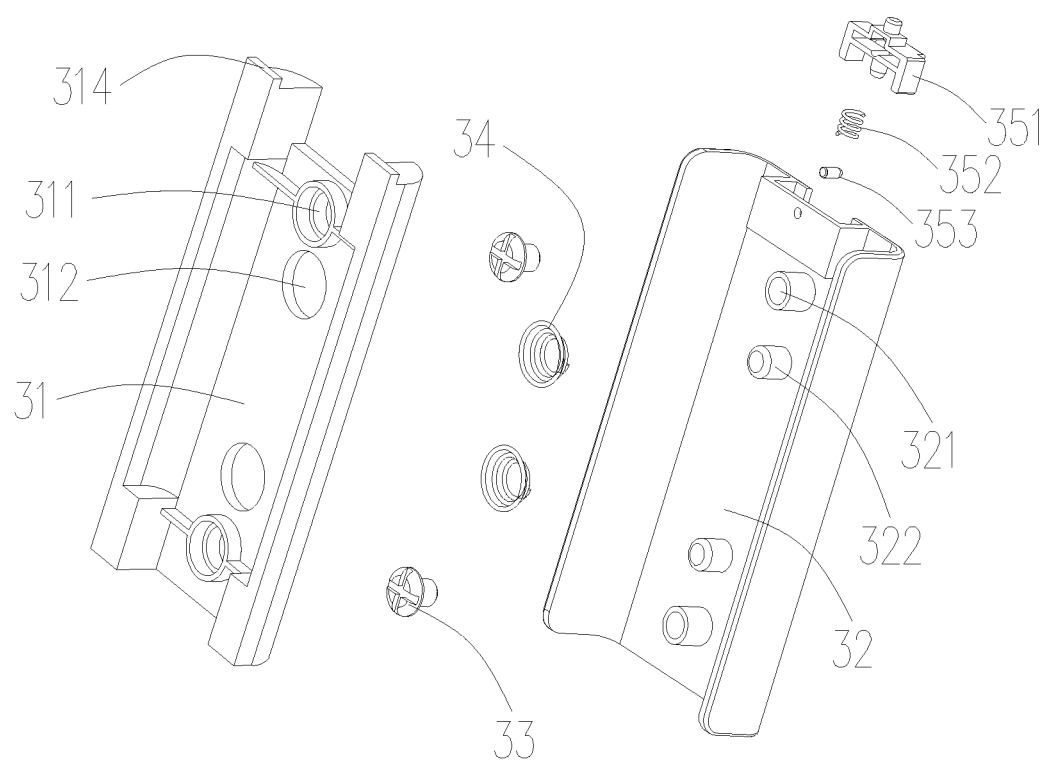
FIG. 2 is an exploded view of an assembly of FIG. 1.

Referring to FIG. 2 and FIG. 6, the lining member 31 is fixedly connected to the mounting groove 101 of the battery main body 10. It can be understood that, the lining member 31 is fixedly connected to the battery main body 10 via threaded connection, adhering connection or latching. In the illustrated embodiment, the lining member 31 defines a threaded hole at an end opposite to the clamping portion 102. The lining member 31 is fixedly connected to the battery main body 10 via fasteners such as screw or bolt. In the illustrated embodiment, in order to prevent a detachment of the end of the lining member 31 opposite to the threaded hole from the mounting groove 101, the end of the lining member 31 opposite to the threaded hole is provided with a protrusion 314. When assembly, the protrusion 314 is first latched within the mounting groove 101, and then the end of the lining member 31 having the threaded hole is fixedly connected to the battery main body 10 via fasteners such as screw or bolt, thereby the lining member 31 is stably mounted.

Referring to FIG. 2, the lining member 31 substantially has a planar shape, the lining member 31 defines a pair of restricting holes 311 and a pair of through holes 312, the pair of restricting holes 311 are positioned on opposite ends of the lining member 31. One through hole 312 is positioned adjacent to one restricting hole 311, the other one through hole 312 is positioned adjacent to the other one restricting hole 311, and the pair of through holes 312 is corresponding to the pair of switches 201, respectively.

The cover 32 is assembled to the lining member 31 and is positioned outside the lining member 31, the cover 32 defines a pair of connecting holes 321 corresponding to the pair of restricting holes 311, the cover 32 is fixedly connected to a pair of ejecting members 322 corresponding to the pair of through holes 312. The pair of ejecting members 322 are corresponding to the pair of through holes 312. The cover 32 is movable away from or toward the lining member 31. When the cover 32 is pressed toward the lining member 31, the ejecting member 322 is allowed to resist the switch 201, causing the switch 201 to be closed. In the illustrated embodiment, the ejecting member 322 is formed and protrudes from the cover 32 inwardly.

Figure 3:
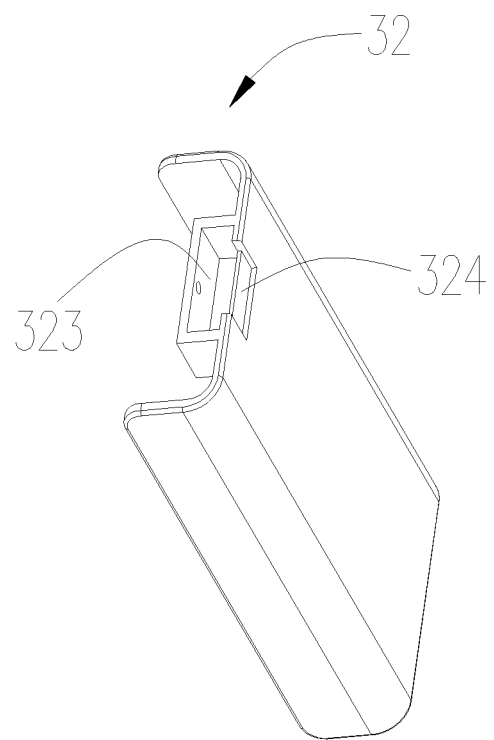
FIG. 3 is an isometric view of a cover of the cover assembly of FIG. 2, viewed from another aspect.

Further, referring to FIG. 3, the cover 32 defines a positioning groove 323 corresponding to the clamping portion 102.

In order to clearly describe a connection relationship of the connecting member 33, it is specified hereby, the end of the connecting member 33 away from the battery main body 10 is defined as an outer end, the end of the connecting member 33 away from the outer end is defines as an inner end. Referring to FIG. 6, the inner end of the connecting member 33 forms an abutting portion 331 extending outwardly from a periphery of the connecting member 33, the abutting portion 331 can resist the restricting hole 311 after the connecting member 33 extends through the restricting hole 311. The outer end of the connecting member 33 is fixedly connected to the connecting hole 321. Further, a diameter of the restricting hole 311 is greater than an outer diameter of the connecting member 33, enabling the cover 32 to move the connecting member 33 when the cover 32 is pressed. In the illustrated embodiment, the connecting member 33 is a screw. A larger end of the screw is the abutting portion 331, a smaller end of the screw is threaded and connected to the cover 32. Therefore, by a configuration of the connecting member 33, the cover 32 is connected to the lining member 31.

The first elastic member 34 is positioned between the lining member 31 and the cover 32, an end of the first elastic member 34 elastically resists the lining member 31, an opposite end of the first elastic member 34 elastically resists the cover 32. Under a natural condition, the cover 32 is exerted by the first elastic member 34 and moves away from the lining member 31, at the time, the switch 201 is separated from the ejecting member 322.

In the illustrated embodiment, the first elastic member 34 is a spring, and a number of the first elastic member 34 is two, the two elastic member 34 are sleeved on the two ejecting members 322 respectively, the ejecting member 322 can provide a restricting function for the first elastic member 34, guaranteeing the first elastic member 34 to be inflexibly resisted between the lining member 31 and the cover 32.

The locking structure 35 includes a locking member 351, a second elastic member 352, and a restricting member 353.

Figure 4:
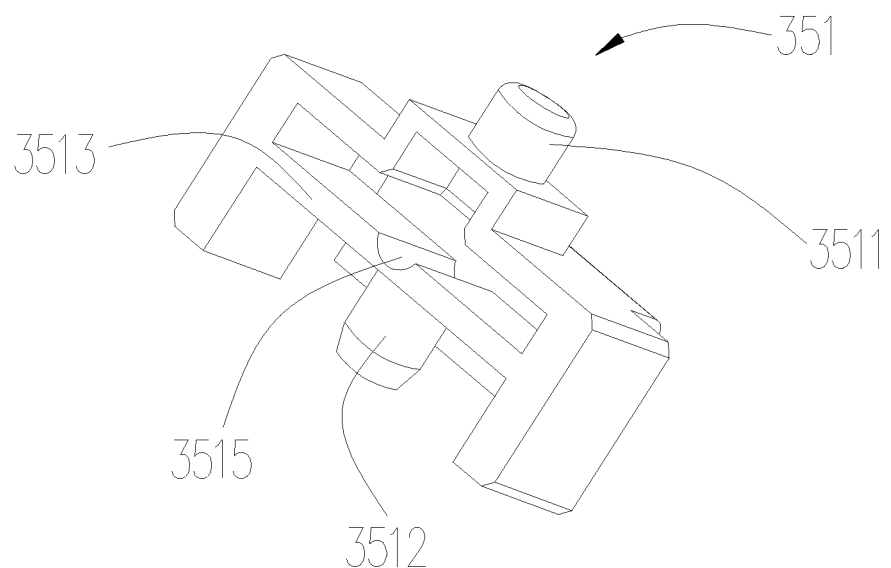
FIG. 4 is a structural view of a cover of the cover assembly of FIG. 2.
Figure 5:
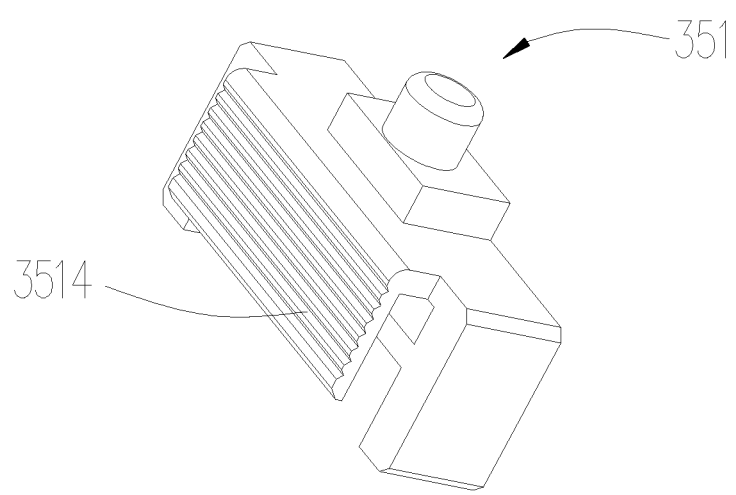
FIG. 5 is a structural view of a locking member of FIG. 2, viewed from another aspect.

Referring to FIG. 4 and FIG. 5, the locking member 351 is slidably positioned in the positioning groove 323 of the cover 32. An end of the second elastic member 352 elastically resists a bottom of the positioning groove 323. An opposite end of the second elastic member 352 elastically resists a lower end of the locking member 351. Under a natural condition, the locking member 351 is exerted by the second elastic member 352 to enable an upper end of the locking portion 3511 to latch in the clamping portion 102, and the lower end of the locking member 351 is latched in the positioning groove 323. When the locking member 351 is toggled downwardly, the second elastic member 352 is compressed, the locking portion 3511 is enabled to detach from the clamping portion 102. In the illustrated embodiment, the locking portion 3511 is a protrusion.

It can be understood that, in alternative embodiment not shown, the locking portion 3511 can be omitted, meanwhile, the upper end of the locking member 351 can latch with the clamping portion 102. Under a natural condition, the upper end of the locking member 351 latches with the clamping portion 102.

Further, in order to toggle the locking member 351 easily, the locking member 351 forms a toggling portion 3514 extending from an external side surface of the locking member 351 outwardly and protruding out of the cover 32. The cover 32 defines a cutout 324 corresponding to the toggling portion 3514, when the toggling portion 3514 is toggled downwardly along the cutout 324, the locking member 351 is driven to compress the second elastic member 352.

In the illustrated embodiment, the lower end of the locking member 351 is provided with a positioning post 3512, the second elastic member 352 is a spring, the second elastic member 352 is sleeved on the positioning post 3512, for providing a restricting function.

It can be understood that, the first elastic member 34 and the second elastic member 352 can also be other members exhibiting rigidity and elasticity, such as thin steel sheets.

The restricting member 353 is fixedly positioned on the sidewall of the positioning groove 323 of the cover 32 adjacent to the battery main body 10. Referring to FIG. 4, the locking member 351 is further provided with a restricting portion 3513, the restricting member 353 can resists a side of the restricting portion 3513 adjacent to the clamping portion 102, thereby a detachment of the locking member 351 from the positioning groove 323 is avoided. In the illustrated embodiment, the restricting member 353 is a restricting pin, the restricting portion 3513 is substantially a restricting plate positioned on a middle of the locking member 351. In the illustrated embodiment, in order to facilitate for the restricting member 353 to resist the restricting portion 3513, the restricting portion 3513 defines a groove 3515 matching the restricting member 353. At the same time, the toggling portion 3514 is toggled downwardly, the end of locking member 351 adjacent to the clamping portion 102 can resist the restricting member 353 for preventing a detachment.

An operation procedure of the battery pack 100 of the present disclosure is specifically described with reference to accompanying drawings.

Figure 7:
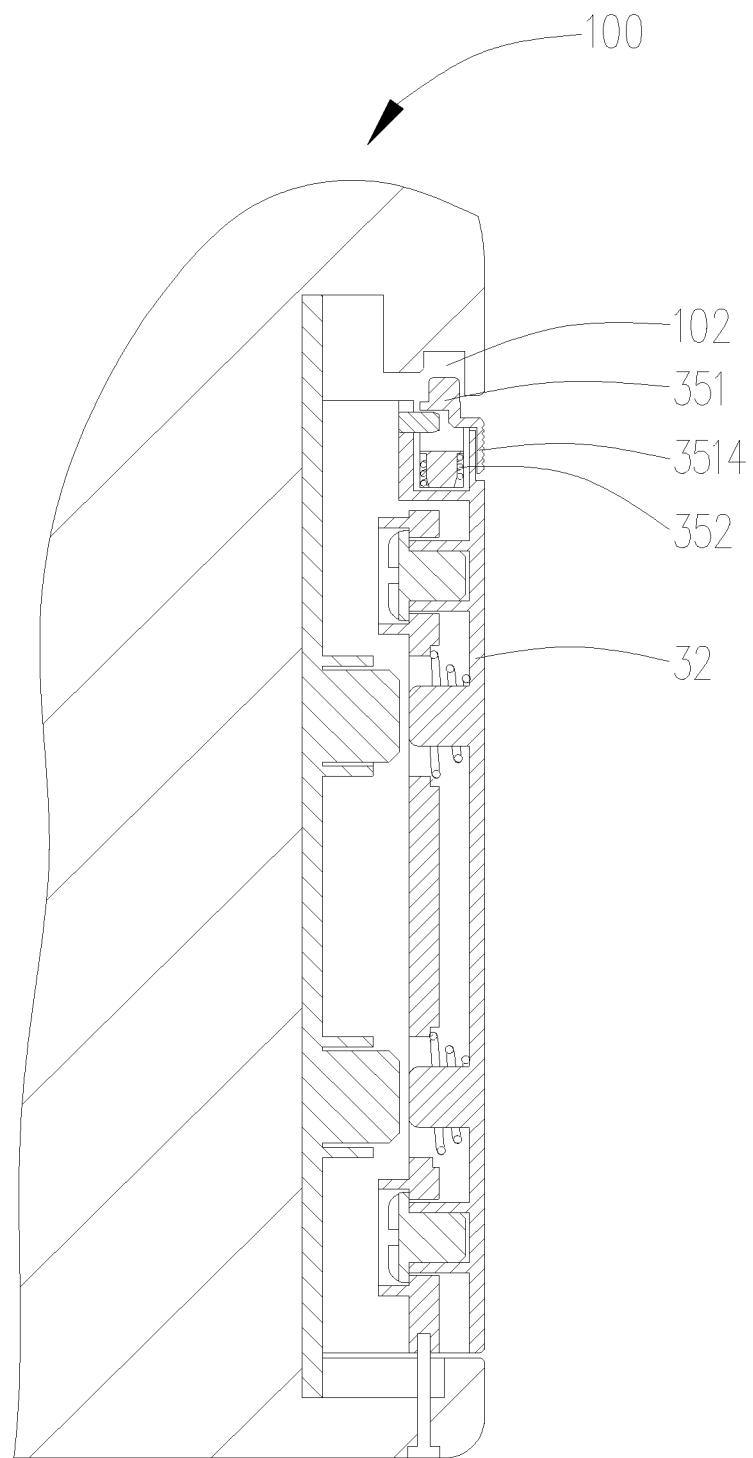
FIG. 7 is a schematic view of the battery pack of FIG. 6 in another state (the cover is unlocked)
Figure 8:
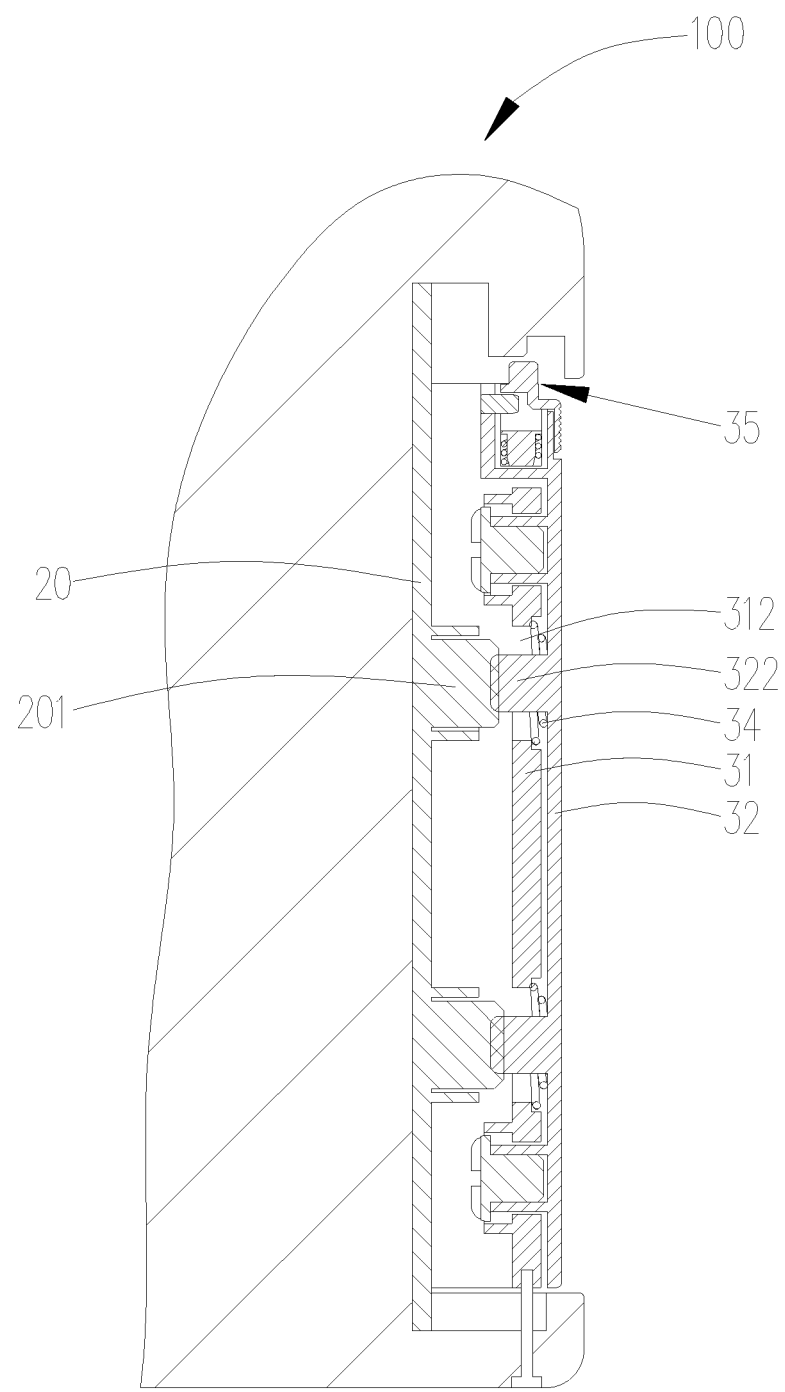
FIG. 8 is a schematic view of the battery pack of FIG. 6 in another state (the cover is pressed)

Referring to FIG. 7, when user want the battery pack 100 to direct power for external appliances, firstly, the toggling portion 3514 is toggled downwardly, causing the toggling portion 3514 driven by the locking member 351 to compress the second elastic member 352 downwardly, until the locking portion 3511 on the upper end of the locking member 351 detaches from the clamping portion 102 of the battery main body 10, thus the cover 32 is unlocked. Referring to FIG. 8, the cover 32 is pressed inwardly by a force subsequently, the cover 32 drives the locking structure 35 to compress the first elastic member 34 toward the lining member 31, until the ejecting member 322 on the cover 32 extends through the through hole 312 of the lining member 31 and resists the switch 201 of the control panel 20, the switch 201 is then closed. At the time, the circuit is powered on. The atomizing core start to work and atomizes the tobacco liquid to generate a smog.

When user do not want the battery pack 100 to provide power for external appliances, the cover 32 is released, and then the cover 32 is exerted by the first elastic member 34 to drive the locking structure 35 moving outwardly and returning to an original position, the ejecting member 322 moves away from the switch 201 gradually, until the ejecting member 322 is separated from the switch 201 completely. When the cover 32 moves to a position that the locking portion 3511 of the locking member 351 is aligned to the clamping portion 102, the locking member 351 is exerted by the second elastic member 352 to draw the locking portion 3511 upwardly, causing the locking portion 3511 to latch with the clamping portion 102, at the time, the cover 32 is locked and the lining member 31 cannot be driven inwardly by pressing the cover 32, the cover 32 returns to a state as shown in FIG. 1 again.

It can be understood that, in alternative embodiment not shown, the lining member 31 and the connecting member 33 both can be omitted, at the time, an end of the first elastic member 34 is fixedly connected to the control panel 20, an opposite end of the first elastic member 34 is fixedly connected to cover 32. The switch 201 is positioned on the control panel 20 and corresponding to the ejecting member 322, the switch 201 is electrically connected to the battery main body 10, such that the cover 32 can also be compressed or released to return to an original position, and the cover 32 cannot detach, it has a simple structure and facilitates for manufacturing.

It can be understood that, a number of the switch 201 and a number of the ejecting member 322 can be only one.

In the battery pack 100 provided by the present disclosure, by a configuration of the locking structure 35, prior to pressing the cover 32, the locking member 351 is toggled first for reliving a locking state of the cover 32, after the battery pack 100 being used, the cover 32 is released, the cover 32 can return to the original position automatically and is locked by the locking structure 35, a contact or swallow by children can be avoided, it has a predetermined children protective function.

In an electronic cigarette provided by the present disclosure, all technical features of aforementioned battery pack 100 is included, thus the electronic cigarette has a technical effect same as that in aforementioned battery pack 100.

The Second Embodiment

Figure 9:
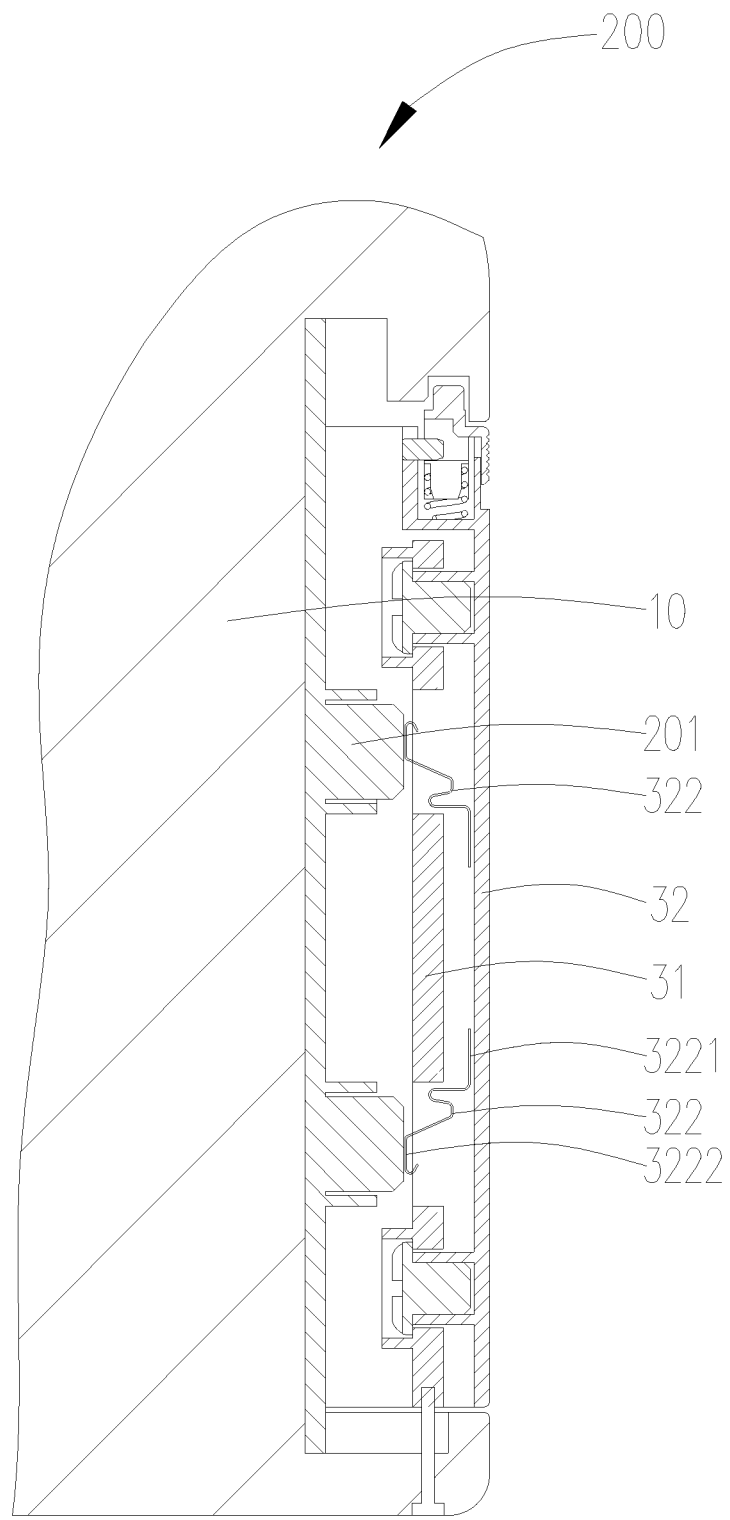
FIG. 9 is a structural view of a battery pack of a second embodiment of the present disclosure (the cover is locked).

Referring to FIG. 9, compared to the battery pack 100 of the first embodiment, the difference in the battery pack 200 of the second embodiment is that, the first elastic member 34 is omitted, at the time, the ejecting member 322 is an member exhibiting an elasticity and a rigid, an end of the ejecting member 322 elastically resists the switch 201, an opposite end of the ejecting member 322 resists the cover 32. In order to prevent the ejecting member 322 form falling between the switch 201 and the cover 32, and avoid a malfunction of the ejecting member 322 acting to the switch 201 and the cover 32, in the illustrated embodiment, an end of the ejecting member 322 is fixedly connected to the cover 32, affecting to a normal use is thereby avoided.

In the illustrated embodiment, the ejecting member 322 is a thin steel sheet having a cross-section with a curved shape, the end of the ejecting member 322 elastically resisting the cover 32 defines a first flat surface 3221, the first flat surface 3221 is fixedly connected to the cover 32, the end of the ejecting member 322 elastically resisting the switch 201 defines a second flat surface 3222, the second flat surface 3222 closely contacts the switch 201, by a surface to surface contact, the connection is stable, and facilitating for the ejecting member 322 to work stably.

Specifically, when the cover 32 is not pressed, i.e. the ejecting member 322 is under a natural state, although the ejecting member 322 resists the switch 201, the elastic force of the ejecting member 322 is not able to drive the switch 201 to be closed, at the time, the battery main body 10 does not direct power outwardly. When the cover 32 is pressed, a deformation of the ejecting member 322 increases gradually, an elasticity of the ejecting member 322 is enhanced, until the ejecting member 322 drives the switch 201 to be closed, at the time, the battery main body 10 directs power for external appliances. When the cover 32 is released, the cover 32 is exerted by the elastic force of the ejecting member 322 and returns to the original position, causing the switch 201 to flick out.

In the battery pack 200 provided by the second embodiment, the first elastic member 34 is omitted, the ejecting member 322 not only provides a closing action to the switch 201, but also provide an action to cause the cover 32 to return to the original position. It has a simple structure that facilitates manufacturing.

The embodiments described above are merely preferred embodiments, but not intended to limit the application. Any modifications, alternatives or improvements made within the principle and spirit of the present application should be interpreted as falling within the protection scope of the present application. The claims are not limited to the features or acts described above. Rather, the proper scope of the disclosure is defined by the appended claims.

What is claimed is:

1. A battery pack, comprising:
a battery main body electrically connected to a switch and defining a mounting groove, and a sidewall of the mounting groove having a clamping portion; and
a cover assembly positioned on the battery main body, comprising:
a cover movably positioned in the mounting groove;
a locking structure positioned on the cover; and
an ejecting member corresponding to the switch, and positioned between the mounting groove and the cover;
wherein the locking structure comprises a locking member movably positioned on the cover and corresponding to a latching portion, and a second elastic member elastically resisted between the cover and the locking member, when the locking member is toggled to separate from the clamping portion, the cover is capable of being pressed to enable the ejecting member to resist and close the switch, when the cover is released, the cover is capable of returning to an original position, and the locking is exerted by the second elastic member to return to the original position and latches with the clamping portion.

2. The battery pack according to claim 1, wherein an end of the ejecting member away from the battery main body is fixedly connected to the cover, the cover assembly further comprises a first elastic member elastically positioned between the battery main body and the cover, when the cover is pressed, the first elastic member compressed by the cover is enabled to drive the ejecting member to move, causing the ejecting member to resist and close the switch, when the cover is released, the cover is exerted by the first elastic member, driving the ejecting member to move and returning to the original position, thereby allowing the ejecting member to separate from the switch.

3. The battery pack according to claim 1, wherein an end of the ejecting member elastically resists the switch, an opposite end of the ejecting member elastically resists the cover, when the cover is pressed, the ejection is deformed and closes the switch, when the cover is released, the ejection returns to the original position and causes the switch to flick out.

4. The battery pack according to claim 2, wherein the cover defines a positioning groove corresponding to the clamping portion, the locking member is movably positioned in the positioning groove, an end of the second elastic member elastically resists a sidewall of the clamping portion away from the positioning groove, an opposite end of the second elastic member elastically resists the locking member.

5. The battery pack according to claim 4, wherein the locking structure further comprises a restricting member fixedly connected to a sidewall of the positioning groove adjacent to the battery main body, the locking member is provided with a restricting portion, the restricting member is capable of resisting a side of the restricting portion adjacent to the clamping portion.

6. The battery pack according to claim 1, wherein the locking member is provided with a locking portion corresponding to the clamping portion, the locking portion engages the clamping portion, when exerted by the second elastic member, the locking portion is a capable of latching with the clamping portion.

7. The battery pack according to claim 4, wherein the cover assembly further comprises a lining member mounted within the mounting groove and a connecting member positioned between the lining member and the cover, the lining member is positioned on a side of the cover adjacent to the battery main body, the lining member is fixedly connected to the cover via the connecting member.

8. The battery pack according to claim 7, wherein the lining member defines a restricting hole, the cover defines a connecting hole corresponding to the restricting hole, an end of the connecting member forms an abutting portion extending outwardly from a periphery of the connecting member, the abutting portion is capable of resisting the restricting hole after the connecting member extends through the restricting hole, an opposite end of the connecting member is fixedly connected to the cover.

9. The battery pack according to claim 8, wherein the lining member defines a through hole corresponding to the switch, the ejecting member extends through the through hole and is capable of resisting and closing the switch.

10. An electronic cigarette, comprising the battery pack according to claim 1.

11. The battery pack according to claim 3, wherein the cover defines a positioning groove corresponding to the clamping portion, the locking member is movably positioned in the positioning groove, an end of the second elastic member elastically resists a sidewall of the clamping portion away from the positioning groove, an opposite end of the second elastic member elastically resists the locking member.

12. The battery pack according to claim 11, wherein the locking structure further comprises a restricting member fixedly connected to a sidewall of the positioning groove adjacent to the battery main body, the locking member is provided with a restricting portion, the restricting member is capable of resisting a side of the restricting portion adjacent to the clamping portion.

13. The battery pack according to claim 11, wherein the cover assembly further comprises a lining member mounted within the mounting groove and a connecting member positioned between the lining member and the cover, the lining member is positioned on a side of the cover adjacent to the battery main body, the lining member is fixedly connected to the cover via the connecting member.

14. The battery pack according to claim 13, wherein the lining member defines a restricting hole, the cover defines a connecting hole corresponding to the restricting hole, an end of the connecting member forms an abutting portion extending outwardly from a periphery of the connecting member, the abutting portion is capable of resisting the restricting hole after the connecting member extends through the restricting hole, an opposite end of the connecting member is fixedly connected to the cover.

15. The battery pack according to claim 14, wherein the lining member defines a through hole corresponding to the switch, the ejecting member extends through the through hole and is capable of resisting and closing the switch.

* * * * *